United States Patent [19]

Serizawa et al.

[11] Patent Number: 4,992,246

[45] Date of Patent: Feb. 12, 1991

[54] OZONIZER

[75] Inventors: Yoshikiyo Serizawa, Neyagawa; Takuo Yamoto, Ibaragi, both of Japan

[73] Assignee: O.C. Engineering Co., Ltd., Osaka, Japan

[21] Appl. No.: 397,432

[22] PCT Filed: May 2, 1988

[86] PCT No.: PCT/JP88/00450

§ 371 Date: Aug. 9, 1989

§ 102(e) Date: Aug. 9, 1989

[87] PCT Pub. No.: WO89/06217

PCT Pub. Date: Jul. 13, 1989

[30] Foreign Application Priority Data

Jan. 10, 1988 [JP] Japan ................................ 63-2751

[51] Int. Cl.⁵ .............................................. B01J 19/08
[52] U.S. Cl. ......................... 422/186.13; 422/186.07; 422/186.21; 422/907
[58] Field of Search ............. 422/186.07, 907, 186.13, 422/186.21

[56] References Cited

U.S. PATENT DOCUMENTS 4,159,971  7/1979  Gneupel ............................. 250/540
4,832,918  5/1989  Horikoshi et al. ............. 422/186.18

FOREIGN PATENT DOCUMENTS 63-30319  2/1988  Japan .

Primary Examiner—Stephen J. Lechert, Jr.
Assistant Examiner—N. Bhat
Attorney, Agent, or Firm—Fidelman & Wolffe

[57] ABSTRACT

This invention relates to an ozonizer for generating ozone by causing a corona discharge to occur between electrodes oppositely arranged in air. An object of the ozonizer is to make the whole device compact and maintenance simple with reduction of the number of accessories. To this end, the ozonizer is characterized by that one of the electrodes comprises blades, the other electrode comprises a casing, and the blades and the casing form a blower. With this arrangement, it is not necessary to provide a particular blower for supplying fresh air continuously to the field of corona discharge and taking out ozone as it is produced.

7 Claims, 2 Drawing Sheets

OZONIZER

BACKGROUND OF THE INVENTION

This invention relates to an ozonizer for generating ozone ($O_3$) by causing a corona discharge to occur between electrodes oppositely arranged in air.

As ozonizers of this type there have been developed various ozonizers in which a pair of electrodes are oppositely arranged in air, to which a high voltage is applied to induce a corona discharge therebetween while continuously supplying air to the discharge field thereby to generate ozone continuously.

In such devices, however, it is necessary that ozone produced in the field of corona discharge should be continuously taken out of the discharge field, and at the same time fresh air (oxygen) should be supplied to the discharge field. Therefore, the conventional ozonizers are provided with a blower, a pump or the like at the front or rear side of the discharge field. Moreover, in the conventional ozonizers, especially in large ones, since the temperature of the electrodes rise due to the corona discharge, it is essential to provide a cooling device. This poses a problem that many accessories must be provided, so that it is difficult to make the whole device compact and simplify maintenance. An object of the invention is to solve such problems completely.

SUMMARY OF THE INVENTION

To attain the object this invention adopts the following arrangement.

The ozonizer of this invention is of the type that a corona discharge is caused to occur between electrodes oppositely arranged in air, and is characterized by that one of the electrodes comprises blades, the other electrode comprises a casing, and the blades and the casing form a blower.

In this construction, by applying a high voltage between the blades which form one electrode and the casing which forms the other electrode, it is possible to cause a corona discharge to take place between them. As the above-mentioned blades are driven by a motor in the same manner as in ordinary ventilators, air (oxygen) is drawn through an intake port and exhausted outside through a space formed between the blades and the casing. At that time, oxygen in the air taken in passes through the field of corona discharge, so that a part of the oxygen is changed to ozone in this discharge field. The ozone produced in this manner is continuously exhausted outside in the above-mentioned flow.

This arrangement makes it unnecessary to provide an apparatus for causing a corona discharge to occur and separately a blower for supplying oxygen to the discharge field and taking out the ozone generated. As a result, the number of parts is reduced and the whole device can be made compact.

Moreover, since the gas positively flows in contact with the blades and the casing which form the electrodes, thermal radiation from the electrodes can be enhanced without difficulty.

Since the device of the invention is constructed as described above, it is possible to generate ozone efficiently, to make the whole device simple and compact, and to provide an ozonizer having a large capacity without the necessity of providing a cooling device having a high ability.

DESCRIPTION OF THE PREFERRED EMBODIMENT

Figure 1:
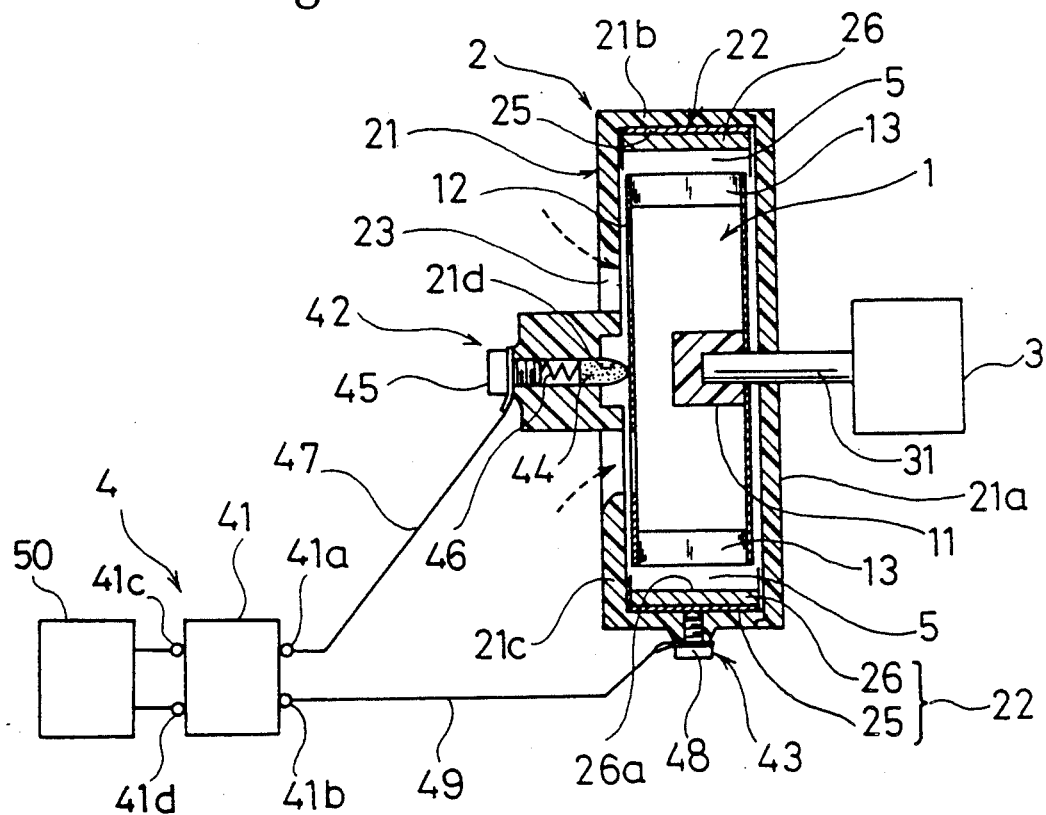
FIG. 1 is a side elevational view showing a cross section of one embodiment of the invention.
Figure 2:
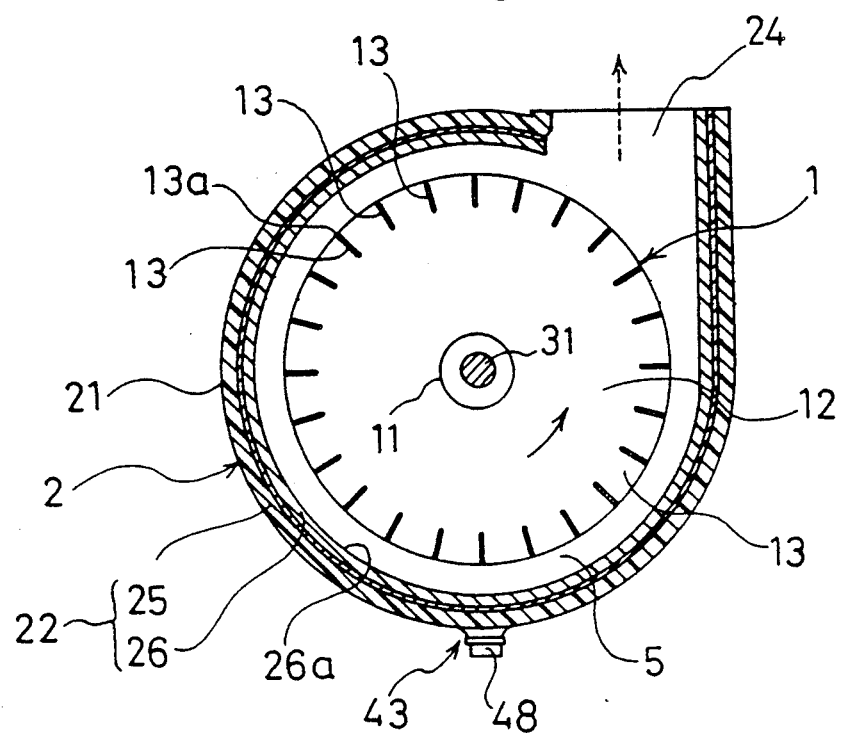
FIG. 2 is a front view showing a cross section of the same embodiment.

One embodiment of the invention will be described below with reference to the drawings.

The ozonizer has a fundamental structure of a Silocco type blower provided with an impeller 1 and a casing 2.

The impeller 1 is provided with a boss 11, circular side plates 12 and blades 13 mounted on the outer peripheral portions of the side plates at predetermined intervals. The boss 11 is made of an insulating material such as ABS resin or vinyl chloride, and a motor 3 has a rotary shaft 31 connected to the boss 11. At least that side plate 12 which is positioned opposite the motor 3 and provided with a window for ventilation and the blades 13 are made of a material having a high electrical conductivity such as stainless steel. The blades 13 function as one of the electrodes. In other words, one of the electrodes is composed of the blades 13.

The casing 2 comprises an outer shell portion 21 and a circumferential wall portion 22 enclosed within the outer shell portion 21. The outer shell portion 21 is made of an insulating material such as ABS resin or vinyl chloride, and is provided with an intake port 23 near the center of its end wall 21a opposite the above-mentioned motor 3 and an outlet port 24 in the circumferential wall 21b thereof. The circumferential wall portion 22 is fixed to the inner surface of the above-mentioned circumferential wall 21b of the outer shell portion 21, and comprises a stainless steel conductor 25 forming the other electrode and a dielectric member 26 made of silicone rubber and attached to the inner circumferential wall of the conductor 25. In other words, in this device the other electrode forms a part of the casing 2.

A power supply 4 impresses a high voltage across the above-mentioned blades 13 and the above-mentioned conductor 25 which form the electrodes. The power supply 4 is provided with a transformer 41 for producing a potential difference, for example, 10000 V ~ 15000 V necessary to generate a corona discharge between output terminals 41a and 41b, a first connecting device 42 for electrically connecting the output terminal 41a of the transformer 41 to the above-mentioned blades 13, and a second connecting device 43 for electrically connecting the other output terminal 41b to the above-mentioned conductor 25. The input terminals 41c and 41d of the above-mentioned transformer 41 are connected to a suitable power supply 50. The first connecting device 42 comprises a carbon-rod brush 44 inserted in the inner end portion of an axial hole 21d formed in the central portion of the end wall 21c of the outer shell portion 21 of the casing 2 at the opposite side of the motor so that the brush 44 can project from and be retracted into the hole, a stainless steel screw 45 screwed to the outer end portion of the hole, and a compression spring 46 of an electrically conductive material interposed between the screw 45 and the above-mentioned brush 44 so as to resiliently urge the above-mentioned brush 44 against the side plate 12 of the above-mentioned impeller 1. The above-mentioned screw 45 is connected to the terminal 41a of the above-mentioned transformer 41 through an electrically conductive wire 47. The second connecting device 43 comprises a stainless steel screw 48 screwed to the outer shell portion 21, with the inner end of the screw 48 contacting the above-mentioned conductor 25, and the outer end thereof being connected to the other output terminal 41b of the above-mentioned transformer 41 through an electrically conductive wire 49.

With this arrangement, the blades 13 which form one of the electrodes are electrically connected to the output terminal 41a of the transformer 41 through the side plate 12, the brush 44, the compression spring 46, the screw 45 and the electrically conductive wire 47. The circumferential wall portion 22 of the casing 2 which forms the other electrode is connected to the other terminal 41b of the above-mentioned transformer 41 through the screw 48 and the electrically conductive wire 49. Therefore, when the transformer 41 is connected to a power supply (not shown), a high voltage is impressed across the above-mentioned blades 13 and the above-mentioned circumferential wall portion 22, so that a corona discharge is induced between the outer end surface 13a of each of the blades 13 which forms an electrode surface and the inner circumferential surface 26a of the above-mentioned dielectric member 26 which forms a dielectric surface.

When the above-mentioned impeller 1 is driven by the motor 3 in the same manner as in a conventional Silocco-type blower, fresh air (oxygen) is taken in through the intake port 23, and exhausted outside through the outlet port 24 passing through a space formed between the blades 13 of the impeller 1 and the circumferential wall portion 22 of the casing 2. At this time, oxygen in the air taken in passes through the field of corona discharge 5, so that a part thereof is changed to ozone. The ozone generated in this manner is taken out of the field of corona discharge 5 through the above-mentioned flow path, and continuously exhausted outside the casing 2 through the outlet port 24.

Thus, this arrangement eliminates the necessity of providing a device for causing corona discharges to be induced and a separate blower for supplying oxygen to the field of corona discharge to generate ozone. As a result, the number of parts is reduced, and an enhancement of efficiency and reliability in manufacture can be achieved, and the whole device can be made compact.

Moreover, since air flows while positively contacting the blades 13 and the casing 2 which form electrodes, radiation of heat from the electrodes can be easily effected, so that it is possible to reduce the cooling ability of the cooling device without difficulty.

With this arrangement, since the blades 13 which form one of the electrodes face at intervals the inner circumferential surface 26a of the dielectric member 26 which forms the dielectric surface of the other electrode, a higher corona discharge can be generated than if plane electrodes were oppositely positioned. Since the positions of the blades 13 relative to the inner circumferential surface 26a of the dielectric member 26 are periodically changed, the electric charge stored on the whole surface of the dielectric member 26 can be used. Therefore, it is possible to enhance the efficiency of ozone generation in comparison with ozonizers with fixed electrodes.

Figure 3:
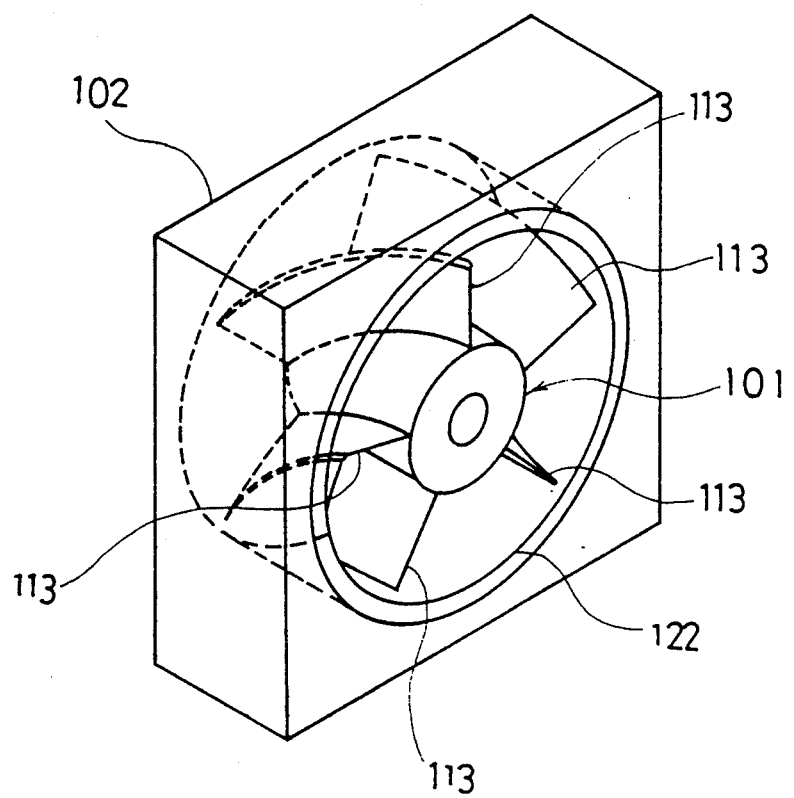
FIG. 3 is a perspective view showing another embodiment of the invention.

The blower to which the invention may be applicable is not limited to the Silocco type, but can be an axial flow type as shown in FIG. 3. In the apparatus shown in FIG. 3, one electrode is composed of blades 113 of an impeller 101 of an axial flow type, and the other electrode is composed of a circumferential wall portion 122 of a casing 102. The material of each part, means for supplying power to each electrode etc. may be selected as in the above-mentioned embodiment.

The ozonizer in accordance with the invention can be used as devices for deodorization, sterilization, bleaching, etc. in various fields of industry.

We claim:

1. An ozonizer for producing ozone from a corona discharge generated between spaced electrodes, said ozonizer comprising a blower wherein said blower comprises an impeller with blades, each of said blades having an outer end surface, and a casing having an inner wall portion circumferentially surrounding a major portion of a circumference of said impeller, said blades forming a first electrode and said inner wall portion forming a second electrode, whereby said corona discharge is generated in a substantially uniform gap between the outer end surfaces of said blades and an inner surface of said inner wall portion.

2. The ozonizer according to claim 1, wherein said inner wall portion forming a second electrode comprises an outer conductor layer and an inner dielectric layer.

3. The ozonizer according to claim 2, wherein said conductor layer is composed of stainless steel.

4. The ozonizer according to claim 2, wherein said dielectric layer is composed of silicone rubber.

5. The ozonizer according to claim 1, further comprising means for rotating the impeller.

6. The ozonizer according to claim 1, further comprising ozone outlet means formed within the casing and extending outwardly from a portion of the circumference of the impeller which is not circumferentially surrounded by said inner wall portion.

7. The ozonizer according to claim 1, wherein said inner wall portion circumferentially surrounds the entire circumference of the impeller.

* * * * *